(12) United States Patent
Kronenberg

(10) Patent No.: US 11,399,919 B2
(45) Date of Patent: Aug. 2, 2022

(54) SENSOR AND SYSTEM FOR MONITORING THE WEARING DURATION OF ORTHODONTIC ELASTICS

(71) Applicant: OTMAR KRONENBERG AG, Lucerne (CH)

(72) Inventor: Otmar Kronenberg, Lucerne (CH)

(73) Assignee: OTMAR KRONENBERG AG, Lucerne (CH)

( * ) Notice: Subject to any disclaimer, the term of this patent is extended or adjusted under 35 U.S.C. 154(b) by 69 days.

(21) Appl. No.: 16/651,410

(22) PCT Filed: Sep. 20, 2018

(86) PCT No.: PCT/EP2018/075445
§ 371 (c)(1),
(2) Date: Mar. 27, 2020

(87) PCT Pub. No.: WO2019/063405
PCT Pub. Date: Apr. 4, 2019

(65) Prior Publication Data
US 2020/0289241 A1    Sep. 17, 2020

(30) Foreign Application Priority Data

Sep. 28, 2017 (EP) .................................. 17193609

(51) Int. Cl.
*A61C 7/30* (2006.01)
*A61C 7/14* (2006.01)
*A61C 7/36* (2006.01)

(52) U.S. Cl.
CPC ............... *A61C 7/303* (2013.01); *A61C 7/14* (2013.01); *A61C 7/36* (2013.01); *A61C 2204/007* (2013.01)

(58) Field of Classification Search
CPC .... A61C 7/08; A61C 7/12; A61C 7/14; A61C 7/303; A61C 2204/007; A61C 19/04;
(Continued)

(56) References Cited

U.S. PATENT DOCUMENTS 5,695,130 A    12/1997   Csendes
9,180,034 B1   11/2015   Kapil
(Continued)

FOREIGN PATENT DOCUMENTS

CN    101309711    11/2008
CN    102215771    10/2011
(Continued)

OTHER PUBLICATIONS

Dong Wang, et al., CN 106308954, "Invisible Monitoring Orthopedic Brace and Manufacturing Method Thereof", Jan. 11, 2017, Translated by JPO and INPIT, (Jun. 2021). (Year: 2021).*
(Continued)

*Primary Examiner* — Heidi M Eide
(74) *Attorney, Agent, or Firm* — Defillo & Associates; Evelyn A. Defillo

(57) ABSTRACT

The invention relates to a sensor (1) for fastening to a multi-bracket appliance for the upper jaw (2), to a multi-bracket appliance for the lower jaw (3), to an aligner for the upper jaw (2') and/or to an aligner for the lower jaw (3'), in order to measure the time span during which a force is applied to a pressure, tension and/or shear-force sensor (11) of the sensor (1), whereby the wearing duration of orthodontic elastics (4) for multi-bracket appliances (2, 3) and/or aligners (2', 3') can be monitored, the sensor (1) being a sensor that is independent of the multi-bracket appliance (2, 3) and the brackets (23) and including a timer, a microcontroller having a data memory, and an elastic holder (16) and/or elastic guide (17). The invention further relates to a
(Continued)

system (5) for monitoring the wearing duration of orthodontic elastics, including the sensor (1), a multi-bracket apparatus or an aligner for the upper jaw (2, 2') and the lower jaw (3, 3'), an elastic (4) and an external reading device. The invention further relates to a method for monitoring the wearing duration of orthodontic elastics and to the use of the sensor (1) and of the system (5).

11 Claims, 6 Drawing Sheets

(58) Field of Classification Search
CPC .......... A61C 7/006; A61C 7/008; A61C 7/10; A61C 7/125; A61C 7/282; A61C 2204/005; A61C 7/00–36; A61B 5/4833; A61B 5/0002; A61B 5/685; G07C 3/02; G06F 19/3418; G16H 20/30; G16H 50/20; G16H 80/00; A61F 5/566; A61F 2005/563; A61F 5/56
USPC ............ D24/180; 433/6, 7, 11, 19; 600/587, 600/589, 590, 595
See application file for complete search history.

(56) References Cited

U.S. PATENT DOCUMENTS

| | | | |
|---|---|---|---|
| 9,993,317 B2 * | 6/2018 | Kottemann | A61C 7/36 |
| 2006/0166157 A1 | 7/2006 | Rahman | |
| 2010/0152599 A1 * | 6/2010 | DuHamel | A61B 5/0803 600/532 |
| 2011/0203931 A1 | 8/2011 | Novosselov | |
| 2013/0140289 A1 * | 6/2013 | Baratier | A61B 5/4833 219/121.83 |
| 2015/0305671 A1 * | 10/2015 | Yoon | A61M 21/02 600/301 |
| 2017/0128168 A1 * | 5/2017 | Bindayel | A61C 7/14 |
| 2017/0215993 A1 * | 8/2017 | Migliorati | G01L 1/22 |
| 2017/0347956 A1 * | 12/2017 | Zegarelli | A61B 5/0836 |
| 2019/0167386 A1 * | 6/2019 | Raghavan | G01N 17/04 |
| 2020/0345534 A1 * | 11/2020 | Lucas | A61C 7/10 |
| 2021/0128273 A1 * | 5/2021 | Kelleher | A61C 7/002 |

FOREIGN PATENT DOCUMENTS

| | | |
|---|---|---|
| CN | 106308954 | 1/2017 |
| CN | 106491220 | 3/2017 |
| CN | 107530154 | 1/2018 |
| EP | 2679985 | 1/2014 |
| GB | 2297706 | 8/1996 |
| JP | 2017524504 | 8/2017 |
| KR | 20170004401 | 1/2017 |
| WO | WO2003096922 | 11/2003 |
| WO | WO2011147985 | 12/2011 |
| WO | WO2016012970 | 1/2016 |

OTHER PUBLICATIONS

Bastien Pesenti et al., CN 102215771, "Orthodontic Systems and Methods Including Parametric Attachments", Oct. 12, 2011, Translated by JPO and INPIT, (Jun. 2021). (Year: 2021).*

Gessler Guido., CN 107530154, "Tracking a Dental Movement", Jan. 2, 2018, Translated by JPO and INPIT, (Jun. 2021). (Year: 2021).*

Alauddin Sammel Shahrier et al., CN 106491220, "Orthodontic Aligners and Devices, Methods, Systems, and Computer Programs Utilizing Same", Mar. 15, 2017, Translated by JPO and INPIT, (Jun. 2021). (Year: 2021).*

Kohani Kambiz, CN 101309711, "Method and Apparatur for Repositioning Teeth", Nov. 19, 2008, Translated by JPO and INPIT, (Jun. 2021). (Year: 2021).*

Lee Jin-Kyun KR 2017/0004401, "Wearable Apparatus Attaching On Tooth", Nov. 27, 2017, Translated by JPO and INPIT, (Jun. 2021). (Year: 2021).*

* cited by examiner

SENSOR AND SYSTEM FOR MONITORING THE WEARING DURATION OF ORTHODONTIC ELASTICS

CROSS REFERENCE TO RELATED APPLICATION

This application is a national stage entry of PCT/EP2018/075445 filed Sep. 20, 2018, under the International Convention claiming priority over European Patent Application No. EP17193609.9 filed Sep. 28, 2017.

TECHNICAL FIELD

The present invention relates to a sensor and a system for monitoring the wearing time of orthodontic elastic bands, a method for monitoring the wearing time, as well as to the use of the sensor and of the system.

BACKGROUND OF THE INVENTION

Misalignment of the teeth is usually corrected by means of what are known as dental braces. On the one hand there are removable braces, i.e. braces of the type that can be removed easily and replaced by the patient themselves, for example aligners. On the other hand there are what are known as fixed braces which can only be affixed to the teeth and removed again by the dental therapist, what are known as multi-bracket apparatuses.

In order to adjust the position of the upper jaw with respect to the lower jaw, often during brace correction, elastic bands are used which are fastened to fixed braces or to aligners. In this regard, typically, a multi-bracket apparatus and/or an aligner is respectively affixed to the upper jaw and to the lower jaw. The multi-bracket apparatuses and aligners have means to which the elastic band can readily be reversibly fastened. In order to adjust the tooth and jaw position, as a rule, the elastic band is mounted on a bracket or the aligner in the upper jaw and on a bracket or the aligner in the lower jaw. Intermaxillary forces, i.e. forces between the upper jaw and the lower jaw, are generated because of the elastic band; these forces are necessary for the adjustment of the tooth and jaw position.

As a general rule, elastic bands of this type can easily be removed and reattached by the patient. In order to obtain the desired adjustment, it is vital for the elastic bands to be worn for a time period which is usually more than 6 hours per day, on the instructions of the therapist.

In order to monitor the therapeutic success, the patient has to have regular check-ups. In this regard, despite the use of braces with elastic bands, no or only a small amount of therapeutic progress can sometimes be observed. In such cases, the therapist does not know whether this is for medical reasons, or whether the patient has not adhered to the required minimum wearing time.

SUMMARY OF THE INVENTION

Thus, the objective of the present invention is to measure and document the wearing time of elastic bands which are fastened to fixed braces or aligners during orthodontic treatments and are used to adjust the position of the upper jaw with respect to the lower jaw during brace correction, in order to obtain objective, and thus patient-independent, data regarding the wearing time of the elastic bands.

This objective was surprisingly achieved by means of a sensor (1) for fastening to a multi-bracket apparatus for the upper jaw (2), to a multi-bracket apparatus for the lower jaw (3), to an aligner for the upper jaw (2') and/or to an aligner for the lower jaw (3'), in order to measure the time period during which a force is exerted on a compressive force, tensile force and/or shear force sensor (11) of the sensor (1), as a result of which the wearing time of orthodontic elastic bands (4) for multi-bracket apparatuses (2, 3) and/or aligners (2', 3') can be monitored, wherein the multi-bracket apparatuses have a plurality of brackets (23), comprising the compressive force, tensile force and/or shear force sensor (11), a microcontroller with timer and data memory (12), wherein the sensor (1)

is a sensor which is independent of the multi-bracket apparatus (2, 3) and the brackets (23), and has a fastening device (15) for fastening the sensor (1) to a multi-bracket apparatus (2, 3) and/or to an aligner (2', 3'), wherein the sensor (1) may also be fastened to an aligner (2', 3') instead of the fastening device (15), and Includes an elastic band holder (16) and/or elastic band guide (17), wherein the elastic band (4) can be fastened to the elastic band holder (16) of the sensor (1) and/or the elastic band (4) can be guided in the elastic band guide (17) of the sensor (1), as a result of which a force acts by means of the elastic band (4) on the compressive force, tensile force and/or shear force sensor (11) of the sensor (1) and the timer measures the time period during which the force acts on the sensor (1).

A system (5) is also claimed for monitoring the wearing time of orthodontic elastic bands for multi-bracket apparatuses (2, 3) and/or aligners (2', 3'), comprising a sensor (1) in accordance with the invention, a multi-bracket apparatus or an aligner for the upper jaw (2, 2') and a multi-bracket apparatus or an aligner for the lower jaw (3, 3'), as well as an elastic band (4) and an external reading device, wherein the multi-bracket apparatuses (2, 3) comprise a plurality of brackets (23) and one arch wire (24) in each case.

In addition, a method is claimed for monitoring the wearing time of orthodontic elastic bands (4) on multi-bracket apparatuses (2, 3) and/or aligners (2', 3') using the system (5) in accordance with the invention, wherein i) a sensor (1) in accordance with the invention is fastened to a multibracket apparatus (2, 3) and/or to an aligner (2', 3'), ii) the elastic band (4) is stretched from a multi-bracket apparatus (2, 3) and/or from an aligner (2', 3') to the other multi-bracket apparatus (2, 3) and/or aligner (2', 3'), wherein the elastic band (4) is fastened to the elastic band holder (16) and/or the elastic band (4) is guided in the elastic band guide (17), as a result of which a force is exerted by means of the elastic band (4) on the compressive force, tensile force and/or shear force sensor (11) of the sensor (1), iii) using the timer, at least the period of time for exerting the force on the compressive force, tensile force and/or shear force sensor (11) is measured and stored in the data memory of the microcontroller (12), and iv) the data stored in the data memory of the microcontroller (12) are read out using the reading device.

Also claimed is the use of the sensor (1) in accordance with the invention, of the system (5) in accordance with the invention and of the method in accordance with the invention for measuring the time period, and thus the wearing time, during which a force acts on a compressive force, tensile force and/or shear force sensor (11) of the sensor (1), for monitoring the wearing time of orthodontic elastic bands on multi-bracket apparatuses (2, 3) and aligners (2', 3') and/or for measuring the force exerted by means of the elastic band (4), in particular the force exerted as a function of the wearing time.

DETAILED DESCRIPTION OF THE INVENTION

Figure 1:
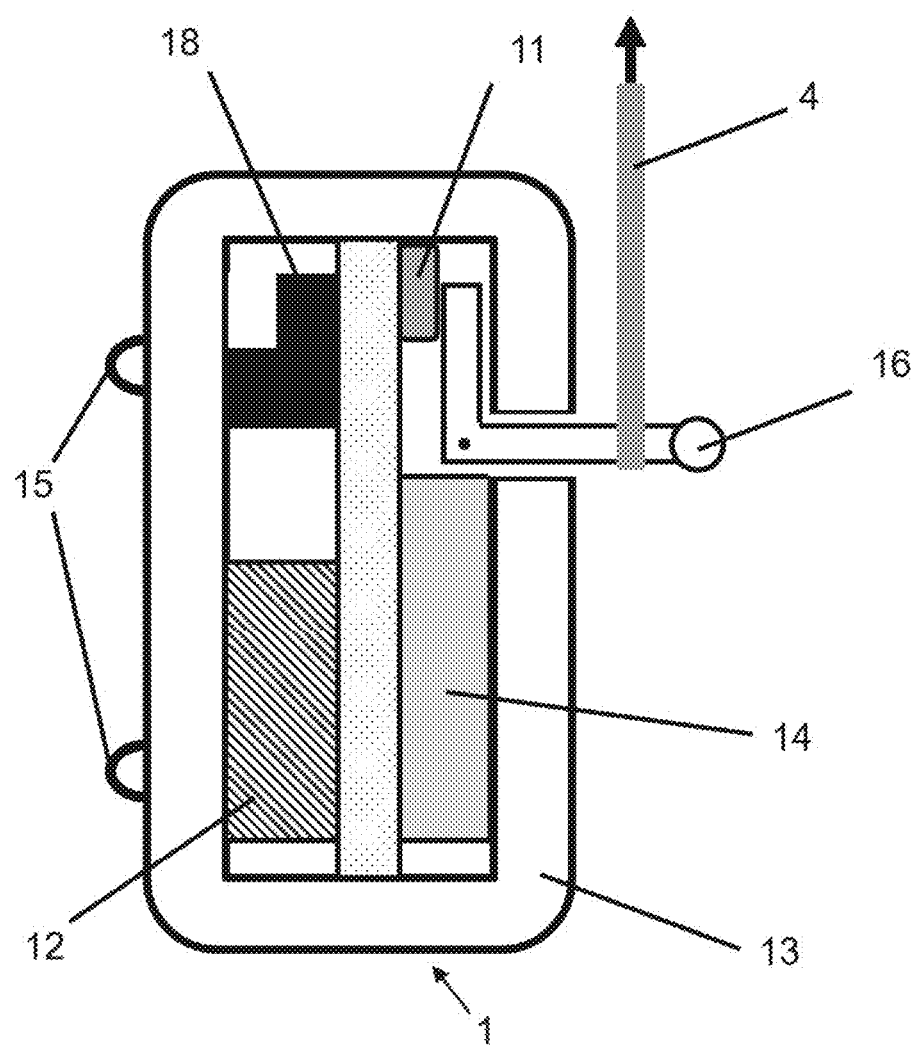
FIG. 1 shows an embodiment of the sensor in accordance with the present invention.

The sensor (1) in accordance with the invention, the system (5) in accordance with the invention, the method in accordance with the invention and the use in accordance with the invention surprisingly exhibit a plurality of advantages. Thus, the time during which the patient wears the elastic bands, i.e. the wearing time of the elastic bands by the patient, can be measured easily, and thus also the time during which a corrective force is exerted on the teeth and the upper jaw and the lower jaw. In this manner, the therapist no longer has to rely on the patient's statements, but with the aid of the present invention, has a neutral means for assessing and checking the wearing time of the orthodontic elastic bands (4) by measuring the period of time during which a force is exerted on the sensor (11).

If the sensor (1) is fastened to a multi-bracket apparatus (2, 3) and/or to an aligner (2', 3'), the elastic band (4)—when it is worn—can be stretched from the upper jaw to the lower jaw, and thus from one to the other multi-bracket apparatus (2, 3). This is also the case with aligners (2', 3'). In this manner, the elastic band (4) can be fastened to the elastic band holder (16) of the sensor (1) and/or in the elastic band guide (17) of the sensor (1). This means that the elastic band (4) exerts a force on the compressive force, tensile force and/or shear force sensor (11) of the sensor (1). The period of time over which a force acts on the compressive force, tensile force and/or shear force sensor (11), in particular by means of the elastic band (4), is measured by the timer and the time period over which a force acts on the compressive force, tensile force and/or shear force sensor (11) of the sensor (1) can then be established. In other words: as soon as the elastic band (4) exerts a force on the compressive force, tensile force and/or shear force sensor (11), then—in the manner of an ON/OFF switch—the time period is measured using a timer, until the elastic band (4) is removed and no more force is exerted on the sensor (11). Then, the timer is also stopped and the completed time period has been measured. If several time periods are measured one after the other, these can be added up.

Because the sensor (1) in accordance with the invention is not integrated into the bracket (23)—and is thus independent of the bracket—the sensor (1) can essentially be fastened to any multi-bracket apparatus (2, 3) and to any aligner (2', 3'). In other words: the sensor (1) in accordance with the invention can easily be fastened to any suitable position on any multi-bracket apparatus (2, 3) or any aligner (2', 3') from any manufacturer. In this manner, the system (5) in accordance with the invention is advantageously not limited to multi-bracket apparatuses (2, 3) from one or a very few manufacturers, but can accommodate any multi-bracket apparatus (2, 3).

In addition, the sensor (1) may also have larger dimensions than the individual bracket (23), whereupon a sensor (1) can be produced which is robust and can satisfy all of the demands placed upon it, even, for example, in respect of the size of the battery and of the radio module. Thus, for example, the size of the sensor (1) is not limited to one tooth surface, as is the case with the brackets (23), but the sensor can extend over two or more tooth surfaces on the same jaw without any problems.

Prior to eating and cleaning teeth, advantageously—and as a general rule—the elastic band (4) is removed. In this regard, after eating and after cleaning the teeth, it is important for the elastic band (4) to be re-fastened to the small hooks of the bracket (23) in order to produce the forces necessary for successful therapy.

WO-A-03/096922 describes an orthodontic bracket for anchoring a fixed orthodontic apparatus to a tooth. The bracket comprises a bracket base to be anchored and a bracket fastening, wherein a sensor means is disposed between the bracket base and the bracket fastening. In this manner, the forces, pressures and/or turning moments applied to the teeth are detected and measured objectively. This means that the orthodontic apparatus can be set up in a manner such that optimal forces and turning moments act on the teeth of the patient in order to obtain an optimal therapeutic outcome. In this regard, a bracket with an integrated sensor is described. However, a sensor which is independent of a bracket which can be fastened to any mufti-bracket apparatus is not mentioned. In addition, the measurement of the intermaxillary forces by means of an elastic band is neither mentioned nor suggested.

WO-A-2001/147985 describes a system for monitoring the correct use of an intra-oral device comprising a power source, a detector for detecting when the intra-oral device is positioned in the mouth for use, a pen for recording measured data and a transponder for transmission of the measured data. The monitoring system can be set up for a specific characteristic of a patient or a group of patients, in particular in the case of debilitating sleep apnoea and snoring. The system is not suitable for the correction of misalignment of the teeth. Multi-bracket apparatuses, aligners and also elastic bands are also not mentioned.

U.S. Pat. No. 9,180,034 describes a device and a method for aiding weight control. In this regard, the device is introduced into the mouth of a patient between opposed molars. The intention is to increase the resistance to chewing, whereupon the consumption of food is slowed down. The device can encompass elastic bands, magnets, shock absorbers, combinations thereof and sensors for detecting the strength and frequency of chewing. The system is not suitable for the correction of misalignments of the teeth. In addition, multi-bracket apparatuses, aligners and timers are not mentioned and no time periods are measured.

US-A-2006/0166157 discloses an orthodontic compliance monitor comprising a sensor which detects when an orthodontic device is correctly positioned, a processor which processes an output of the sensor and produces compliance data, as well as a storage device for storing data. The system concerns only one jaw and is intended to check whether an orthodontic device is being worn correctly. Thus, it is not suitable for adjusting the position of the upper jaw with respect to the lower jaw or for monitoring whether an elastic band is being worn or not. In addition, multi-bracket apparatuses and aligners for the upper jaw and lower jaw, as well as orthodontic elastic bands, are not mentioned and no intermaxillary forces are measured.

In accordance with the invention, the term "multi-bracket apparatuses (2, 3)"—also known as fixed braces—should be understood to mean a fixed orthodontic apparatus which essentially consists of a plurality of—as a rule different—brackets (23) and an arch wire (24). The brackets (23) are bonded by the therapist to the outside of a plurality of teeth of at least one jaw. Next, an arch wire (24), also termed the treatment arch wire, is guided along the brackets (23). During the course of the treatment, the arch wire (24) is changed several times, wherein each new arch wire (24) has increased dimensions and rigidity, whereupon the teeth are moved. Such multi-bracket apparatuses with brackets (23) and arch wire (24) are known to the person skilled in the art and are commercially available.

In accordance with the invention, the term "brackets (23)" should be understood to mean all types of brackets which can be used in the production of multi-bracket apparatuses. The respective type and shape of the brackets (23) is individually selected as a function of the tooth and the position it has to correct. Thus, brackets (23) may also have small hooks for the fastening of elastic bands. In accordance with the invention, the term "bracket (23)" also encompasses tubes or strips. The brackets may be prepared from steel, in particular stainless steel, ceramic or plastic. Suitable brackets are known to the person skilled in the art and are commercially available.

In accordance with the invention, the term "aligner (2', 3') should be understood to mean transparent plastic strips which are individually produced for the respective positioning of the teeth. As a rule, aligners are transparent and can barely be noticed from the outside. When required, it is generally possible to attach an elastic band holder to the aligner or to integrate one into the aligner during production. For this purpose, a notch, for example, can be introduced into the aligner (2', 3'). As an alternative, a fastening means, for example a button, could be bonded directly to the tooth, whereupon the aligner (3') has a recess at this position. Suitable fastening means such as buttons are known to the person skilled in the art and are commercially available. In contrast to the fixed multi-bracket apparatus, aligners can be taken out by patients, i.e. they are removable.

In accordance with the invention, the term "elastic band (4)" means any suitable means which dentists use with multi-bracket apparatuses (2, 3) or aligners (2', 3') in order to exert a force on the upper jaw and/or lower jaw. In this regard, the elastic band (4) may also be prepared from a material other than rubber. Typically, the elastic band (4) is a rubber strip which can be reversibly stretched by the application of force. Particularly preferably, the elastic band (4) is in the form of rubber rings, i.e. in the form of a short piece of rubber in the form of a ring. With the aid of the elastic band (4), the multi-bracket apparatus (2) or the aligner (2') of the upper jaw is connected to the multi-bracket apparatus (3) or to the aligner (3') of the lower jaw. In this regard, the elastic band (4) is preferably fastened to a bracket (23), to the arch wire (24), to a tooth, to a small hook integrated into the aligner (2', 3') and/or to the sensor (1), in particular to the elastic band holder (16) of the sensor (1).

The Sensor (1)

The sensor (1) in accordance with the invention is particularly suitable for fastening to a multi-bracket apparatus for the upper jaw (2), to a multi-bracket apparatus for the lower jaw (3), to an aligner for the upper jaw (2') and/or to an aligner for the lower jaw (3'), in order to measure the time period during which a force is exerted on a compressive force, tensile force and/or shear force sensor (11) of the sensor (1), whereupon the wearing time of orthodontic elastic bands (4) for fixed multi-bracket apparatuses (2, 3) and/or removable aligners (2', 3') can be monitored, i.e. measured and stored. In addition, the sensor (1) may, for example, also be used for the measurement of the force exerted by the elastic band (4), i.e. compressive force, tensile force and/or shear force—as a function of the wearing time. The time period is measured with a timer integrated into the sensor. One or more than one sensor (1) may be used per patient at the same time.

The sensor (1) in accordance with the invention is a sensor which is independent of the multi-bracket apparatus (2, 3) and the brackets (23), i.e. the sensor (1) does not interact with either the multi-bracket apparatus (2, 3), the brackets (23) or with the aligner (2', 3'). The sensor (1) comprises a compressive force, tensile force and/or shear force sensor (11), a microcontroller with a timer and data memory (12), a fastening device (15) for fastening the sensor (1) to a multibracket apparatus (2, 3) and/or to an aligner (2', 3'), as well as an elastic band holder (16) and/or elastic band guide (17). In this regard, the elastic band (4) can be fastened to the elastic band holder (16) of the sensor (1) and/or the elastic band (4) can be guided in the elastic band guide (17) of the sensor (1), whereupon by means of the elastic band (4), a force can be exerted on the compressive force, tensile force and/or shear force sensor (11) of the sensor (1). In this manner, both the compressive force, tensile force and/or shear force sensor (11) as well as the elastic band holder (16) and/or the elastic band guide (17) of the sensor (1) are arranged in a manner such that when the elastic band (4) is worn, the force exerted by the elastic band (4) is transmitted to the compressive force, tensile force and/or shear force sensor (11). In addition, the elastic band holder (16) typically comprises at least one means, for example a small hook, for fastening elastic bands.

The timer measures the time period during which force is exerted on the sensor (1). In this regard, the timer may be produced as software or as hardware. Suitable timers are known to the person skilled in the art, who can make a suitable selection.

Instead of the fastening device (15), the sensor (1) may also be fastened to an aligner (2', 3'), in particular bonded and/or disposed within the aligner, i.e. seated. Thus, the sensor (1) could be enclosed by the plastic of the aligner (2', 3') in a manner such that the sensor (1) is fixed to or in the aligner (2', 3'). This embodiment is advantageously implemented during the production of the aligner (2', 3'). As an alternative, the therapist, for example the dentist, could fasten the sensor (1) to or into the aligner (2', 3')—for example using an adhesive and/or by pressing. In this manner, the sensor (1) is independent of the aligner (2', 3') and the sensor (1) does not interact with the aligner (2', 3').

The microcontroller with data memory and timer (12) of the sensor (1) enables and, inter alia, monitors inputting and read-out of the data detected in the compressive force, tensile force and/or shear force sensor (11) to and from the data memory of the microcontroller (12). Typically, the timer in the form of software or hardware can be controlled with the aid of the frequency of the microcontroller. In addition, with the aid of the microcontroller, computing operations can be carried out with the detected and/or stored data. In this regard, the microcontroller may be part of the compressive force, tensile force and/or shear force sensor (11) and/or of the data memory. As an alternative or in addition, the microcontroller (12) can also be present in the sensor (1) as a separate component, i.e. a component which is independent of the data memory. In accordance with the invention, however, they are mentioned together as the microcontroller with timer and data memory (12), as the microcontroller with data memory (12) or in fact as only the microcontroller (12) or data memory (12), irrespective of whether they are in the form of one component or a plurality of components.

In a preferred embodiment, the sensor (1) additionally comprises a housing (13), a power supply (14), in particular a battery, and/or a data transmission device (18), in order to read out the measured data which is also stored in the sensor (1)—in particular in the data memory (12), i.e. to another medium such as, for example, to a computer. In this regard, the data transmission device (18) comprises a radio transmitter and/or a plug connection. Read-out of the data may be carried out regularly—for example daily—for example by the patient, and/or be carried out automatically by means of a radio transmission. Often, however, the read-out is preferably carried out during the periodic check-up by the therapist. Read-outs may, for example, be transmitted by means of wireless, by means of NFC, RFID and/or Bluetooth, and/or by means of a plug connection, to the external reading device. In this regard, the sensor (1) can remain fastened to the multi-bracket apparatus (2, 3) or to the aligner (2', 3'), or it can be removed for reading out and optionally then be reconnected to the multi-bracket apparatus (2, 3) or to the aligner (2', 3').

Figure 2:
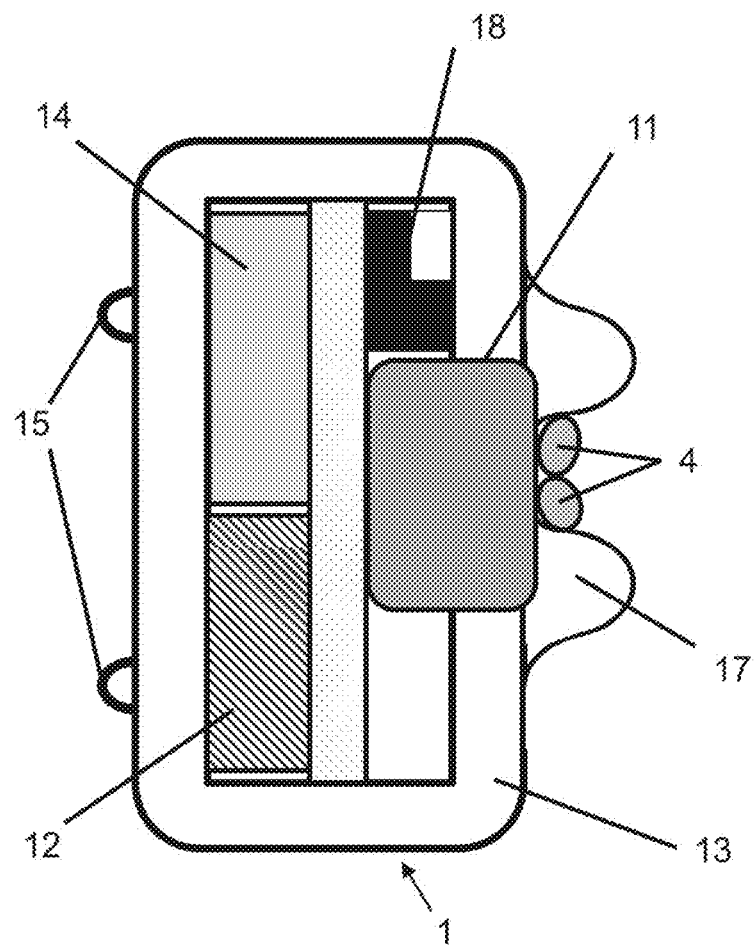
FIG. 2 shows another embodiment of the sensor in accordance with the present invention.
Figure 3:
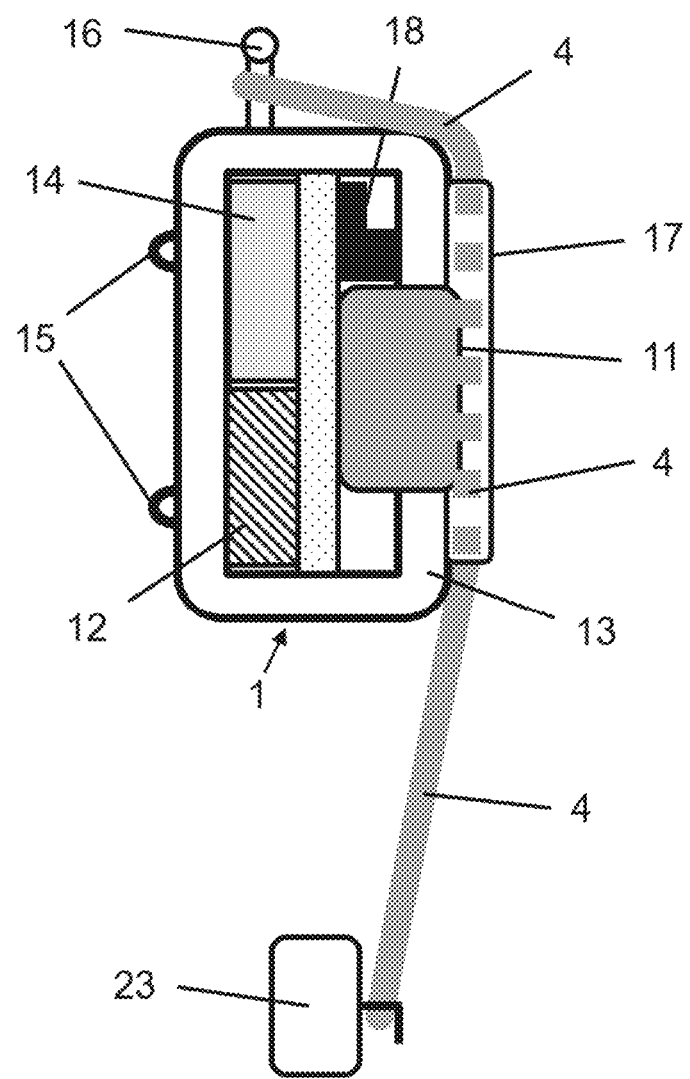
FIG. 3 shows the elastic band fastened to the elastic band holder of the sensor.

In a further preferred embodiment of the sensor (1), an elastic band (4) can be fastened in a reversible manner to the elastic band holder (16) of the sensor (1) in order to connect the elastic band holder (16) to a bracket (23), arch wire (24) or aligner (2', 3'). In this regard, when the elastic band (4) is stretched, optionally—in particular preferably —, the elastic band holder (16) exerts a force on the compressive force, tensile force and/or shear force sensor (11) of the sensor (1), whereupon in the sensor (1) at least the time during which this force is exerted is measured and stored. A non-limiting embodiment is shown in FIG. 1. As an alternative—or in combination—an elastic band (4) can be guided in the elastic band guide (17) of the sensor (1), whereupon a force is exerted on the compressive force, tensile force and/or shear force sensor (11) when the elastic band (4) is stretched from one bracket (23) of the multi-bracket apparatus of the upper jaw (2) or from the aligner of the upper jaw (2') to a bracket (23) of the multi-bracket apparatus of the lower jaw (3) or to the aligner of the lower jaw (3'). An exemplary arrangement of this type is shown in FIG. 2. In this regard, optionally, in particular preferably, instead of being fastened to a bracket (23) or aligner (2', 3'), the elastic band (4) may also be fastened to the elastic band holder (16) of the sensor (1), as can be seen in FIG. 3.

In a preferred embodiment, the fastening device (15) comprises a grommet, clamp, screw, a wire, elastic band, plug connection, elastic and/or adhesive surface, by means of which the sensor (1) can essentially be fastened to any desired multibracket apparatus (2, 3) and to any desired aligner (2', 3'). The person skilled in the art will be aware of fastening means and types of fastening of this type and with them, will be able to correctly and suitably attach the sensor (1) in accordance with the invention to the multi-bracket apparatus (2, 3) and to the aligner (2', 3').

The System (5)

The system (5) in accordance with the invention is in particular for monitoring, i.e. for measuring and storing, the wearing time of orthodontic elastic bands for multi-bracket apparatuses (2, 3) and/or aligners (2', 3'). Surprisingly, in the system in accordance with the invention, brackets, multi-bracket apparatuses, aligners and elastic bands from any manufacturer may be used, as long as they are suitable for orthodontic applications. The system (5) comprising the sensor (1) may also be used to measure the force exerted by the elastic band (4)—as a function of the wearing time.

The system (5) comprises a sensor (1) in accordance with the invention, a multi-bracket apparatus or an aligner for the upper jaw (2, 2') and a multi-bracket apparatus or an aligner for the lower jaw (3, 3'), as well as an elastic band (4) and an external reading device, wherein the multi-bracket apparatuses (2, 3) each comprise a plurality of brackets (23) and an arch wire (24). In this regard, per patient, one sensor (1) which is fastened to the upper jaw or lower jaw of the patient, may be sufficient. However, it is also possible to use two or more sensors (1) with patients, typically one sensor (1) per elastic band (4) employed. If necessary, it is also possible to attach a sensor (1) to both the upper jaw and also to the lower jaw. In this regard, advantageously, at least one bracket (23) of the multi-bracket apparatus or of the aligner for the upper jaw (2, 2') or of the multi-bracket apparatus or the aligner for the lower jaw (3, 3') comprises an arrangement—in particular a small hook, for fastening elastic bands.

In the system (5), the sensor (1) may be fastened by means of the fastening device (15), which is typically rigidly connected to the sensor (1), to one or more brackets (23) of any multi-bracket apparatus (2, 3) or any aligner (2', 3'). It is also possible for the sensor (1) to additionally—or only—be fastened to the arch wire (24). Alternatively—or in combination—it may also be fastened to one or more teeth.

In a preferred embodiment of the system (5), the fastening device (15) of the sensor (1) can be connected to at least one bracket (23) and/or the arch wire (24) of a multi-bracket apparatus (2, 3), and/or an aligner (2', 3') using a fastening means.

Suitable—and often preferred—fastening means for fastening the fastening device (15) of the sensor (1) to a multi-bracket apparatus (2, 3) and/or to an aligner (2', 3') include a wire, a screw, a clamp, an elastic band, an elastic, a plastic and/or an adhesive or an adhesive combination. In this regard, typically, the fastening means is matched to the fastening device (15) of the sensor (1), in order to obtain suitable fastening. The person skilled in the art will be aware of what fastening means are suitable for the specific application and which fastening means can be optimally combined with which fastening device (15). If, in addition, the sensor (1) is fastened to an aligner, it is also possible to connect the sensor (1) directly during the production of the aligner (2', 3') to the sensor.

In a preferred embodiment of the system (5) in accordance with the invention, the sensor (1) in accordance with the invention, when it is fastened to a multi-bracket apparatus (2, 3), i) is disposed between two brackets (23) of the same multi-bracket apparatus (2, 3), and/or ii) extends over at least one bracket (23) of the same multi-bracket apparatus (2, 3), preferably over at least two brackets (23).

In another preferred embodiment of the system (5) in accordance with the invention, the sensor (1) in accordance with the invention, when it is fastened to an aligner (2', 3'), is i) disposed in the lateral external region of the aligner (2', 3'), and/or extends over at least one tooth crown of the same aligner (2', 3').

The Method

The method in accordance with the invention is particularly suitable for monitoring, i.e. for measuring and storing, the wearing time of orthodontic elastic bands (4) on multi-bracket apparatuses (2, 3) and/or aligners (2', 3') using the system (5) in accordance with the invention. In addition, the method may, for example, also be used for measuring the force exerted by the elastic band (4)—as a function of the wearing time.

In a first step i) of the method in accordance with the invention, the sensor (1) in accordance with the invention is—as described above—fastened to a multibracket apparatus (2, 3) and/or to an aligner (2', 3'), typically with a fastening means by means of the fastening device (15). In this regard, fastening the sensor (1) to the multi-bracket apparatus (2, 3) is carried out after the multi-bracket apparatus has been fastened to the teeth. Fastening the sensor (1) to the aligner (2', 3') may be carried out during or after the production of the aligner (2', 3'). If, following the production of the aligner (2', 3'), the sensor (1) is fastened to the aligner (2', 3'), then fastening of the sensor (1) to the aligner (2', 3') may be carried out outside the mouth or directly inside the mouth. In all cases, this step is carried out by the therapist.

In a second step ii) of the method in accordance with the invention, the elastic band (4) is stretched from one multi-bracket apparatus (2, 3) and/or from an aligner (2', 3') to the other multi-bracket apparatus (2, 3) and/or aligner (2', 3'), whereupon the elastic band (4) is fastened to the elastic band holder (16) of the sensor (1) and/or the elastic band (4) is guided in the elastic band guide (17) of the sensor (1), as a result of which a force acts by means of the elastic band (4) on the compressive force, tensile force and/or shear force sensor (11) of the sensor (1). This step is carried out first directly after the step i) by the therapist and then carried out regularly, i.e. typically several times a day, by the patient themselves.

In a further step iii) of the method in accordance with the invention, using the timer, at least the time period of the force exerted on the compressive force, tensile force and/or shear force sensor (11), i.e. the time period during which the force produced by the elastic band (4) is exerted on the compressive force, tensile force and/or shear force sensor (11), is measured. In this regard, the time period measured with the timer is stored in the data memory of the microcontroller (12) of the sensor (1). This step is therefore always carried out when the elastic band (4) is fastened to the multi-bracket apparatus (2, 3) and/or to the aligner (2', 3').

In a further step iv) of the method in accordance with the invention, the data stored in the data memory of the microcontroller (12) of the sensor (1) are read out using the reading device. In this regard, a specific reading device may be used as the reading device which, for example, is optimized for this step of the method. As an alternative, a computer and/or mobile phone such as a smart phone may be used as the reading device which can read out the data from the data memory (12) of the sensor (1). In this regard, reading out of the data is typically carried out using the usual methods which are familiar to the person skilled in the art. As a general rule, this step is carried out during the check-up and post-adjustment by the therapist. As an alternative—or in addition—read-out of the data may also be carried out at shorter intervals of time, for example daily. In this regard, the data are preferably transmitted wirelessly, and optionally using the internet, to the reading device. The reading device may, for example, be located in the therapist practice and/or at another location, for example a central location, from which the collated data is transmitted on to the individual therapist practices.

In a preferred embodiment of the method in accordance with the invention, the data stored in the data memory (12) of the sensor (1) is transmitted wirelessly, in particular by means of NFC, RFID or and/or Bluetooth, and/or by means of a plug connection, i.e. by means of a cable connection, to the external reading device and optionally stored, processed further and/or printed out.

The Use

The sensor (1) in accordance with the invention, the system (5) in accordance with the invention and the method in accordance with the invention are suitable for use with orthodontic apparatuses, in particular multi-bracket apparatuses (2, 3) and aligners (2', 3') for upper jaws and lower jaws.

A particularly preferred use comprises measuring the time period, and thus the wearing time, during which a force acts on a compressive force, tensile force and/or shear force sensor (11) of the sensor (1), for monitoring—and therefore measuring and storing—the wearing time of orthodontic elastic bands on multi-bracket apparatuses (2, 3) and aligners (2', 3') and/or for measuring the force exerted by means of the elastic band (4).

The sensor (1), the system (5) and the method may also—in particular in addition to monitoring the wearing time—be used for measuring the force exerted by the elastic band (4), in particular for measuring the exerted force as a function of the wearing time.

The following reference numerals are employed:
1 sensor
2 multi-bracket apparatus for the upper jaw
3 multi-bracket apparatus for the lower jaw
2' aligner for the upper jaw
3' aligner for the lower jaw
4 elastic band
5 system
11 compressive force, tensile force and/or shear force sensor (11)
12 microcontroller with timer and data memory
13 housing
14 power supply
fastening device
16 elastic band holder
17 elastic band guide
18 data transmission device
23 plurality of brackets
24 arch wire Non-limiting, preferred embodiments of the sensor (1) in accordance with the invention and of the system (5) in accordance with the invention will now be described with the aid of the accompanying drawings. They should not be construed as being limiting in scope and should be understood to form part of the description:

FIG. 1 shows, by way of example, a non-limiting embodiment of the sensor (1) in accordance with the invention. In the centre of the housing (13) is a circuit board (feint patterning), to which, by way of example, the microcontroller with timer and data memory (12), a battery as the power supply (14), a transmitter as the data transmission device (18) as well as a compressive force, tensile force and/or shear force sensor (11) are connected. The microcontroller with timer and data memory (12), the power supply (14), data transmission device (18) and the compressive force, tensile force and/or shear force sensor (11) are connected together via the circuit board in a manner such that the desired information can be exchanged and such that the power supply to the individual components is ensured.

An elastic band (4) is affixed to the elastic band holder (16) of the sensor (1). This now extends from the one multi-bracket apparatus (2, 3) to which the sensor (1) is fastened, in the direction—indicated by the arrow—of a small hook of a bracket (23) of the other multi-bracket apparatus (2, 3). If now the elastic band is correctly stretched between the two multi-bracket apparatuses (2, 3), tension is exerted on the elastic band holder (16) of the sensor (1). Because of the L-shaped arrangement of the elastic band holder (16) with the fulcrum at the corners of the elastic band holder (16), a pressure now arises on the sensor (11). This pressure triggers the timer—in the manner of an ON/OFF switch—, whereupon the time period is measured during which the elastic band exerts the pressure. The measured information is stored on the data memory (12) and optionally processed further.

At the outside of the housing (13) opposite the elastic band holder (16) are grommets acting as the fastening device (15) for the sensor (1), with which the sensor (1) can be fixed to the multi-bracket apparatus (2, 3).

FIG. 2 shows, by way of example, a non-limiting embodiment of the sensor (1) in accordance with the invention. Inside the housing (13) is the microcontroller with the timer and data memory (12), the power supply (14), the data transmission device (18) as well as the compressive force, tensile force and/or shear force sensor (11). These are connected together via the circuit board (feint patterning) in a manner such that the desired information can be exchanged and such that the power supply to the individual components is ensured. On an external side of the housing (13) are grommets as the fastening device (15) for the sensor (1), with which the sensor (1) can be fixed to the multi-bracket apparatus (2, 3).

On the side of the housing (13) which is opposite to the fastening device (15), an elastic band guide (17) for the sensor (1) is disposed—by way of example and shown in cross section—in which the elastic band (4) lies and exerts pressure on the compressive force, tensile force and/or shear force sensor (11). In order to increase the sensitivity of the sensor (11), by way of example, this extends somewhat beyond the dimensions of the housing (13), so that the elastic band (4) can exert a somewhat greater pressure on the sensor (11). In this regard, the elastic band (4) is typically fastened to a respective bracket (23), in particular to a small hook of a bracket (23), of the multi-bracket apparatus for the upper jaw (2) and of the multi-bracket apparatus for the lower jaw (3) (not shown).

FIG. 3 shows, by way of example, another non-limiting embodiment of the sensor (1) in accordance with the invention. In analogous manner to the view shown in FIG. 2, the elastic band (4) is guided through the elastic band guide (17), wherein, however, the elastic band (4) is fastened to the elastic band holder (16) of the sensor (1) and is guided within the elastic band guide (17) to a bracket (23) of the other multi-bracket apparatus, where the elastic band (4) is fastened to a small hook.

In like manner to FIG. 2, the compressive force, tensile force and/or shear force sensor (11) extends somewhat beyond the dimensions of the housing (13), so that the elastic band (4) can exert a somewhat greater pressure on the sensor (11). As soon as a greater pressure is measured, this triggers the timer until the pressure is removed, i.e. until the elastic band (4) is removed. In this manner, the time period is measured during which a force is exerted on the compressive force, tensile force and/or shear force sensor (11) of the sensor (1), whereupon the wearing time for orthodontic elastic bands (4) for multi-bracket apparatuses (2, 3) and/or aligners (2', 3') can be monitored.

Figure 4:
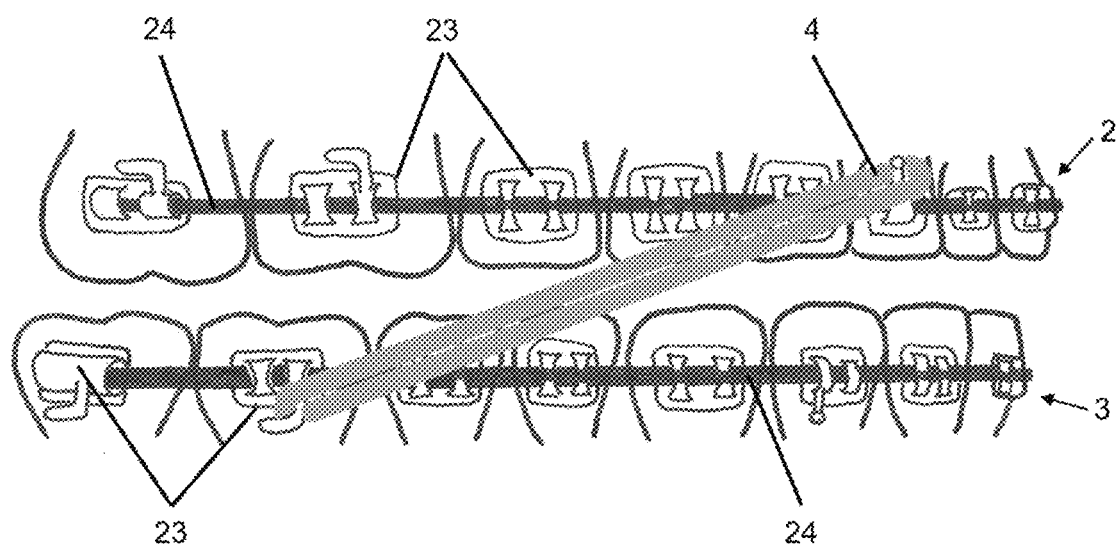
FIG. 4 shows the brackets of the upper jaw and the brackets of the lower jaw.

FIG. 4 shows a currently used multi-bracket apparatus for the upper jaw (2) and a multi-bracket apparatus for the lower jaw (3), each with a plurality of different brackets (23) without the sensor (1) in accordance with the invention, and thus represents the prior art. Some of the brackets (23) which are connected together with the arch wire (24) have a small hook to which, for example, an elastic band (4) can be fastened. The elastic band (4) is advantageously removed prior to eating and cleaning the teeth. In this regard, it is important that after eating and after cleaning the teeth, the elastic band (4) is re-fastened to the small hooks of the bracket (23) in order to produce the forces which are necessary for successful therapy. Using this system which is currently widely used, however, means that checking whether the elastic bands are actually being worn cannot be carried out.

Figure 5:
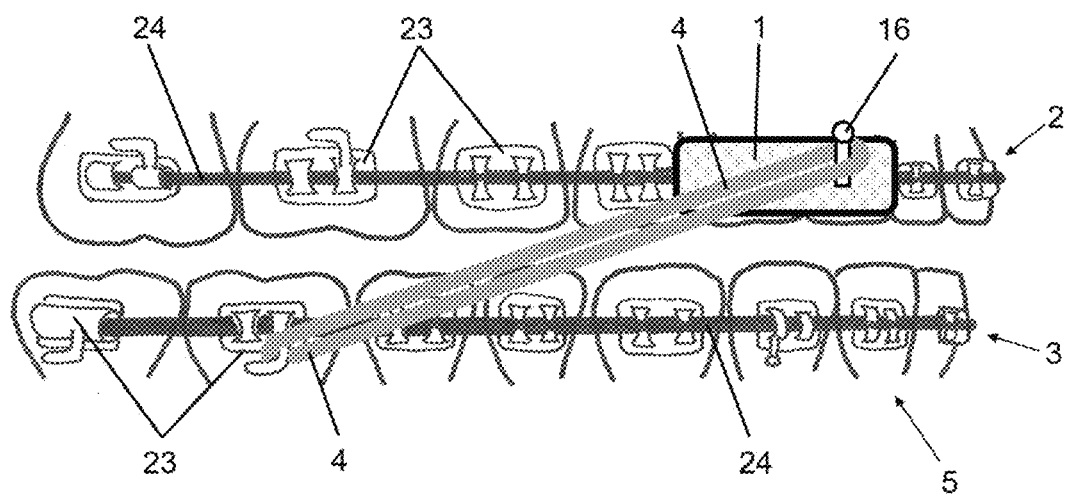
FIG. 5 shows the sensor according to the present invention being attached to the brackets of the upper jaw and the brackets of the lower jaw of FIG. 4.

FIG. 5 shows the system (5) in accordance with the invention comprising the sensor (1) in accordance with the invention which, by way of example, is fastened to the multi-bracket apparatus for the upper jaw (2), and thus to the brackets (23) and/or the arch wire (24). The sensor (1) extends, for example, along approximately two teeth and correspondingly also covers two brackets (23). The sensor (1) comprises an elastic band holder (16) to which the elastic band (4) is fastened. The elastic band (4) carries on to the multi-bracket apparatus of the lower jaw (3), where it is affixed to a small hook of a bracket (23). The sensor (1) can naturally also be fastened to the multi-bracket apparatus for the lower jaw (3). When the elastic band (4) is stretched, by means of the elastic band holder (16), a pressure is exerted on the compressive force, tensile force and/or shear force sensor (11) disposed in the sensor (1). In this manner, in the sensor (1) the time is measured at least with the timer and stored in the data memory of the microcontroller (12) of the sensor (1). As an example, the timer is integrated into the microcontroller in the form of software and is not indicated separately. During the next check-up with the therapist, then, the data stored in the data memory of the microcontroller (12) can be read out via the data transmission device (18), which is typically integrated into the sensor (1), by means of a reading device (not shown) and then evaluated.

If the elastic band (4) has not been worn or has not been worn enough, then there is no or only a little adjustment of the position of the upper jaw with respect to the lower jaw. However, this can be objectively established by the therapist solely by means of the sensor (1) and system (5) in accordance with the invention, the method in accordance with the invention as well as the use in accordance with the invention, because the elastic band (4) does not exert any pressure on the sensor (1).

Figure 6:
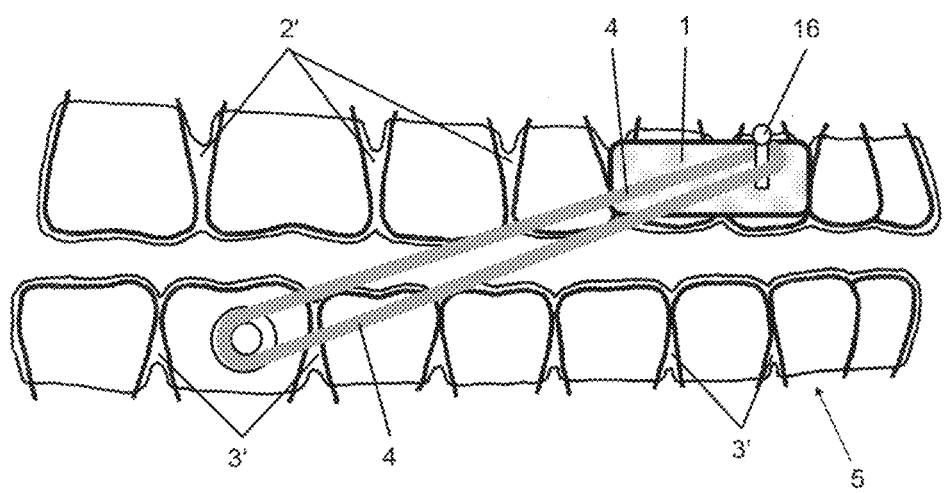
FIG. 6 shows the system in accordance with the invention showing an aligner for the upper jaw and an aligner for the lower jaw.

FIG. 6 shows the system (5) in accordance with the invention comprising an aligner for the upper jaw (2') and an aligner for the lower jaw (3'). The aligners are disposed around the teeth, bordered by the gum and represented by a thinner line. The sensor (1) in accordance with the invention is, by way of example, fastened to the aligner for the upper jaw (2') and extends along approximately two teeth. The sensor (1) comprises an elastic band holder (16) to which the elastic band (4) is fastened. The elastic band (4) carries on to the aligner of the lower jaw (3'), where in this embodiment it is fastened to a button. Buttons of this type are known to the person skilled in the art and are typically adhered directly to the tooth, whereupon the aligner (3') has a recess at this location. As an alternative, the elastic band may, for example, be fastened to a notch introduced into the aligner (3'). Naturally, the sensor (1) may also be affixed to the aligner for the lower jaw (3') and the button or the recess may be affixed to the aligner for the upper jaw (2'). When the elastic band (4) is stretched, a pressure is then exerted by means of the elastic band holder (16) on the compressive force, tensile force and/or shear force sensor (11) disposed in the sensor (1). In this manner, in the sensor (1), the time is measured at least by means of the timer and stored in the data memory of the microcontroller (12) of the sensor (1). Periodically, for example during the next check-up by the therapist, the data stored in the data memory (12) can then be read out via the data transmission device (18), which is typically integrated into the sensor (1), using a reading device (not shown) and can then be evaluated. In this manner, in a simple manner, the wearing time of the elastic band (4) can be determined. This is extremely helpful, in particular when the wearing time is insufficient—and thus when the treatment outcome is insufficient.

The invention claimed is:

1. A sensor adapted to be fastened to a multi-bracket apparatus, and/or an aligner for monitoring the wear time of an orthodontic elastic band, the sensor comprising:
   a compressive force sensor, a tensile force sensor, and/or a shear force sensor,
   a microcontroller with a timer and a data memory for storing time period,
   a fastener device for fastening the sensor on the multi-bracket apparatus and/or the aligner, and
   an elastic-band holder and/or an elastic-band guide,
   wherein the orthodontic elastic band can be fastened on the elastic-band holder and/or can be guided in the elastic-band guide;
   wherein the timer is configured to measure the time period during which the force is exerted on the compressive force sensor, the tensile force sensor, and/or the shear force sensor from the orthodontic elastic band wherein the time period is the wear time of the orthodontic elastic band.

2. The sensor according to claim 1, wherein the sensor further includes a housing, a power supply, and/or a data transmitter device.

3. The sensor according to claim 2, wherein the data transmitter device comprises a radio transmitter and/or a plug connection.

4. The sensor according to claim 1, wherein the fastener device comprises a grommet, a clamp, a screw, a wire, an elastic band, a plug connection, an elastic and/or an adhesive surface on which the sensor is fastened on the desired multi-bracket apparatus or the desired aligner.

5. A system for monitoring the wearing time of an orthodontic elastic bands for a multi-bracket apparatus or aligners, the system comprising:
   the sensor according to claim 1;
   the multi-bracket apparatus or the aligners, wherein the multi-bracket apparatus comprises a multiplicity of brackets and an arch wire for the upper jaw and a multiplicity of brackets and an arch wire for the lower jaw, wherein the aligners comprise an aligner for the upper jaw and an aligner for the lower jaw;
   the orthodontic elastic band; and
   an external reading device for reading the time period stored on the data memory.

6. The system according to claim 5, wherein the fastener device of the sensor is connected to at least one of the multiplicity of brackets to the arch wire, or the aligner.

7. The system according to claim 6, wherein the fastener device comprises a wire, a screw, a clamp, an elastic band, an elastic, a plastic, and/or an adhesive or an adhesive combination.

8. The system according to claim 5, wherein the sensor is fastened on the multi-bracket apparatus,
   is arranged between two of the multiplicity of brackets of the same multi-bracket apparatus, and/or
   extends over at least one of the multiplicity of brackets of the same multi-bracket apparatus.

9. The system according to claim 5, wherein the sensor is fastened on the aligner,
   is arranged in a lateral external region of the aligner, and/or
   is adapted to extend over at least one tooth crown of the same aligner.

10. A method for monitoring a wearing time of an orthodontic elastic band (4) on a multi-bracket apparatus, or aligners, using the system according to claim 5, the method comprising the steps of:
    i) fastening the sensor on the multi-bracket apparatus of the upper or lower jaw, or on the aligner for the upper or lower jaw,
    ii) stretching the orthodontic elastic band from the multi-bracket apparatus for the upper jaw to the multi-bracket apparatus of the lower jaw, or
    stretching the orthodontic elastic band from the aligner for the upper to the aligner of the lower jaw,
    wherein the orthodontic elastic band is fastened to the elastic-band holder of the sensor or the orthodontic elastic band is guided in the elastic-band guide of the sensor, as a result of the force exerted by the elastic orthodontic band on the compressive force sensor, the tensile force sensor, and/or the shear force sensor,
    iii) measuring by using the timer, the time period of the force exerted on the compressive force sensor, the tensile force sensor, and/or the shear force sensor and saving the measured times in the data memory of a microcontroller, and
    iv) reading by using the external reading device, the measured times saved in the data memory of the microcontroller.

11. The method according to claim 10, further including the step of transmitting the data saved in the data memory of the microcontroller, the data saved is transmitted wireless, by means of NFC, RFID and/or Bluetooth, and/or by means of a plug connection, to the external reading device and saved, processed further, and/or printed out.

* * * * *